US012361867B2

(12) United States Patent
Ju et al.

(10) Patent No.: US 12,361,867 B2
(45) Date of Patent: Jul. 15, 2025

(54) MICRO DISPLAY PIXEL DRIVER CONTROLLER

(71) Applicant: JADE BIRD DISPLAY (SHANGHAI) LIMITED, Shanghai (CN)

(72) Inventors: Jing Ju, Shanghai (CN); Hongyun Liu, Shanghai (CN); Chunming Li, Shanghai (CN)

(73) Assignee: JADE BIRD DISPLAY (SHANGHAI) LIMITED, Shanghai (CN)

( * ) Notice: Subject to any disclaimer, the term of this patent is extended or adjusted under 35 U.S.C. 154(b) by 0 days.

(21) Appl. No.: 18/537,819

(22) Filed: Dec. 13, 2023

(65) Prior Publication Data

US 2024/0203326 A1 Jun. 20, 2024

(30) Foreign Application Priority Data

Dec. 16, 2022 (WO) ................ PCT/CN2022/139657

(51) Int. Cl.
*G09G 3/32* (2016.01)
*G09G 3/20* (2006.01)

(52) U.S. Cl.
CPC ............. *G09G 3/32* (2013.01); *G09G 3/2018* (2013.01); *G09G 2300/0842* (2013.01); *G09G 2310/027* (2013.01); *G09G 2310/0272* (2013.01); *G09G 2320/0626* (2013.01); *G09G 2330/12* (2013.01)

(58) Field of Classification Search
None
See application file for complete search history.

(56) References Cited

U.S. PATENT DOCUMENTS

| | | | |
|---|---|---|---|
| 2004/0061672 | A1 | 4/2004 | Page et al. |
| 2018/0322827 | A1 | 11/2018 | Zhang et al. |

FOREIGN PATENT DOCUMENTS

| | | | | |
|---|---|---|---|---|
| CN | 1540615 A | 10/2004 | | |
| CN | 107038994 A | 8/2017 | | |
| CN | 109920368 A | 6/2019 | | |
| CN | 109922572 A | 6/2019 | | |
| CN | 110322829 A | 10/2019 | | |
| CN | 113646827 A | 11/2021 | | |
| CN | 113707077 A | 11/2021 | | |
| WO | WO-2006108277 A1 * | 10/2006 | ............. | G01R 19/00 |

OTHER PUBLICATIONS

International Search Report and Written Opinion in counterpart PCT Application No. PCT/CN2022/139657, dated Mar. 22, 2023.

* cited by examiner

*Primary Examiner* — Duane N Taylor, Jr.
(74) *Attorney, Agent, or Firm* — FINNEGAN, HENDERSON, FARABOW, GARRETT & DUNNER LLP

(57) ABSTRACT

A pixel driver controller includes a reference current source configured to supply a reference current, a current mirror source configured to provide a mirror current, a first current switch coupled to the current mirror source to receive the mirror current, a pixel display data memory configured to store pixel display data coupled to the first current switch, a second current switch coupled to the first current switch, and a controller coupled to the second current switch and configured to control a switch-on status of the second current switch.

16 Claims, 2 Drawing Sheets

MICRO DISPLAY PIXEL DRIVER CONTROLLER

CROSS REFERENCE TO RELATED APPLICATIONS

This patent application claims the benefit of Patent Cooperation Treaty Application No. PCT/CN2022/139657, filed Dec. 16, 2022, the disclosure of which is incorporated by reference herein in its entirety.

TECHNOLOGY FIELD

The disclosure relates to a micro display system including a pixel driver controller array.

BACKGROUND

A light emitting diode (LED), which is a type of semiconductor diode, can convert electrical energy into optical energy, and emit light having a different gray scale value depending on a material of a light emitting layer included in the LED.

Digital display technology has become one of the largest branches in the field of modern electronics and optoelectronics and generates demands in various applications where an image forming function is needed. Among those applications, a micro-LED display, which has the potential of generating an image with better contrast, within shorter response times, with more energy efficiency, with higher refresh rate, and with less background noise, is of interest.

Nowadays, wearable devices, including smart wearable devices, sometimes require a mini display screen on the device. Compared to traditional electronic devices having a screen, these smart wearable devices (such as, a smart watch, a smart phone, an augmented reality headset, etc.) require the screen to be smaller in size, to respond to a user's control more quickly, to use as little energy as possible, to provide a higher refresh rate, and to have less background lights, so that the device does not emit excessive heat, can last longer, and can produce better quality images. Therefore, a mini display screen having a high-contrast, quick-response, energy-efficient, and higher refresh rate screen with less background noise for wearable devices is in demand.

In an LED system, a back plane and power source combination determines size, brightness, contrast, energy efficiency, and thermal management of the LED system. In a conventional LED system, the back plane and power source combination is bulky and introduces energy loss into the system, which may cause the LED system to not provide sufficient brightness and contrast or refresh rate. Such a system is not suitable for wearable devices because of these deficiencies. An improved LED system for wearable devices is needed.

SUMMARY

In accordance with the present disclosure, there is provided a pixel driver controller. The controller includes: a reference current source configured to supply a reference current; a current mirror source, coupled to receive the reference current, configured to provide a mirror current having a current value equal to a current value of the reference current; a first current switch coupled to the current mirror source to receive the mirror current, the first current switch being further coupled to a light emitting diode (LED) device to control flow of the mirror current to the LED device; a pixel display data memory coupled to the first current switch and configured to store pixel display data; a second current switch coupled to the first current switch; and a controller coupled to the second switch and configured to control at least one of a global brightness or a gray scale level of the LED device by controlling a switch-on status of the second current switch.

In further accordance with the present disclosure, there is provided a display back plane system. The system includes: a power controller, and a pixel driving controller array. The pixel driving controller array further includes: a reference current source configured to supply a reference current; a current mirror source, coupled to receive the reference current, configured to provide a mirror current having a current value equal to a current value of the reference current; a first current switch coupled to the current mirror source to receive the mirror current, the first current switch being further coupled to a light emitting diode (LED) device to control flow of the mirror current to the LED device; a pixel display data memory coupled to the first current switch and configured to store pixel display data; a second current switch coupled to the first current switch; and a processing time controller coupled to the second switch and configured to control at least one of a global brightness or a gray scale level of the LED device by controlling a switch-on status of the second current switch.

In further accordance with the present disclosure, there is provided a display. The display includes: a light emitting diode (LED); a reference current source configured to supply a reference current; a current mirror source, coupled to receive the reference current, configured to provide a mirror current having a current value equal to a current value of the reference current; a first current switch coupled to the current mirror source to receive the mirror current, the first current switch being further coupled to the LED device to control flow of the mirror current to the LED device; a pixel display data memory coupled to the first current switch and configured to store pixel display data; a second current switch coupled to the first current switch; and a controller coupled to the second switch and configured to control at least one of a global brightness or a gray scale level of the LED device by controlling a switch-on status of the second current switch.

DESCRIPTION OF THE EMBODIMENTS

Hereinafter, embodiments consistent with the disclosure will be described with reference to the drawings. Wherever possible, the same reference numbers will be used throughout the drawings to refer to the same or like parts.

As discussed above, a conventional LED back plane system for wearable devices is bulky and introduces energy loss and excessive heat into LED systems. As a result, the conventional LED back plane system is not suitable for wearable devices because a wearable device requires the system to be relatively small in size, to produce sufficient brightness and contrast for a user, to be energy efficient, to provide a sufficient refresh-rate for a display screen, and to produce as little background light as possible.

Consistent with embodiments of the present disclosure, a micro LED back plane system includes an LED array suitable for wearable devices and a combination of a reference current source and a current mirror source configured to supply steady power to the LED system. This ensures the micro LED display system can be smaller in size, produce steady light with sufficient brightness and contrast, be energy efficient, and provide a sufficient refresh-rate for the display screen.

Some embodiments consistent with the present disclosure include a micro display back plane system, including a data interface, an image processing module, a pixel driving controller array, a row driver, a power controller, and at least one sensor. The image processing module includes a display frame buffer and a one-time programmable ("OTP") memory. Some embodiments consistent with the present disclosure include a reference current source, a current mirror source, at least two current switches, an LED device, an internal memory, a global brightness controller, a test circuit, and a shared electrode. Some embodiments consistent with the present disclosure include a reference current source, at least two current mirror circuits, an LED device, an internal memory, a global brightness controller, a test circuit, and a shared electrode. The micro display back plane systems consistent with disclosed embodiments are capable of overcoming the drawbacks of conventional micro display back plane systems, including micro LED back plane systems.

Figure 1:
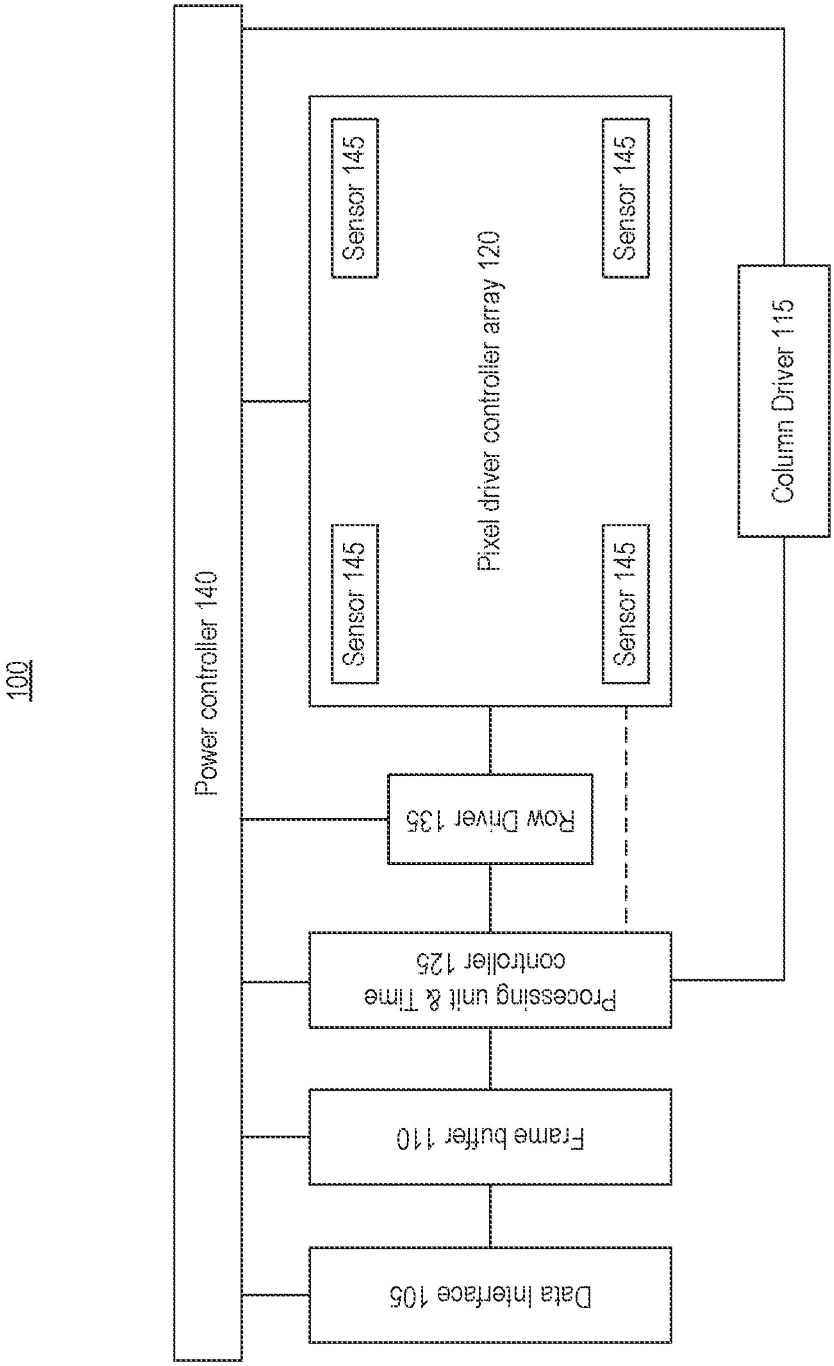
FIG. 1 is a schematic block diagram of an exemplary micro display back plane system for an LED display device, according to an exemplary embodiment of the present disclosure.

FIG. 1 is a schematic block diagram of an exemplary micro display back plane system 100 for an LED display device consistent with embodiments of the present disclosure. The micro display back plane system 100 includes a data interface 105. In some embodiments, the data interface 105 can be provided as an information exchange component that may be installed software, internal hardware, or a peripheral device. The micro display back plane system 100 also includes a display frame buffer 110. The display frame buffer 110 is coupled to the data interface 105. In some embodiments, the display frame buffer 110 is provided as random-access memory ("RAM") of the micro display back plane system 100. In some embodiments not shown in FIG. 1, the frame buffer 110 is also coupled to a one-time-programmable ("OTP") memory. In some embodiments not shown in FIG. 1, the OTP memory is provided as a non-volatile memory that can only be programmed once. In some embodiments, the OTP memory stores programs for performing image processing.

The micro display back plane system 100 further includes a processing unit and time controller 125 coupled to the frame buffer 110. In some embodiments, the processing unit and time controller 125 can be provided as a circuit, a chip, a microchip, or other electronic components or devices configurable to process digital image data by processing original digital image data, such as frame data, and producing optimized image data using one or more specific algorithms and parameters obtained from the OTP memory. In some embodiments, the processing unit and time controller 125 is implemented as software executed on a processor, included in the image enhancer 125, which is capable of performing the image data enhancement. In some embodiments, the processing unit and time controller 125 includes a graphic processing unit ("GPU") and a timing controller.

The micro display back plane system 100 also includes a column driver 115 coupled to the processing unit and time controller 125. In some embodiments, the column driver 115 comprises drivers provided as one or more sets of integrated LED circuits, chips, or microchips. The micro display back plane system 100 also includes a row driver 135. The row driver 135 is also coupled to the processing unit and time controller 125. In some embodiments, the row driver 135 comprises drivers provided as one or more sets of integrated LED circuits, chips, or microchips.

The micro display back plane system 100 further includes a pixel driver controller array 120 coupled to the column driver 115 and the row driver 135. In some embodiments, the pixel driver controller array 120 is also coupled to the processing unit and time controller 125. In some embodiments, the pixel driver controller array 120 can be provided as a circuit, a chip, a microchip, or other electronic components or devices configurable to control pixels of an LED display.

The micro display back plane system 100 further includes a power controller 140 coupled to the data interface 105, the frame buffer 110, the processing unit and time controller 125, the column driver 115, the row driver 135, and the pixel driver controller array 120. In some embodiments, the power controller 140 can be provided as a switch, a circuit, a chip, a microchip, a current source, or other electronic components or devices configurable to control power for the back plane system 100.

The micro display back plane system 100 further includes one or more sensors 145 coupled to the pixel driver controller array 120. In some embodiments, the one or more sensors 145 include a temperature sensor configured to detect temperature of the pixel driver controller array 120. More specifically, each of the one or more sensors 145 detects and monitors temperature of the pixel driver controller array 120 and provides the detected temperature value to a general purpose computer that the micro display back plane system 100 is coupled to, so that the general purpose computer can shut down power to the back plane system 100 if the temperature of the pixel driver controller array 120 reaches a threshold value, such as 80 degree Celsius, or any temperature preset by the user, the manufacture, or that meets industrial standards of LED system manufacture.

Consistent with the present disclosure, the data interface 105 is configured to receive and provide data for the back plane system 100. Specifically, the data interface 105 provides raw image data it receives to the frame buffer 110.

In some embodiments, the data interface 105 receives image data input from an image data providing electronic device inside or outside of the system 100. For example, the data interface 105 may receive raw image data, pre-processed frame data, or both, from a ROM, a hard drive, or from a peripheral device such as a camera, a video recording device, a portable driver, a USB driver, a touch screen, or other device generating raw image data. The raw image data can be raster graphics data, vector image data, video data, or other forms of image data that are currently, or may become, available. In some embodiments, the data interface 105 connects with an external data-providing device through a physical connection, such as through an electronic cable. In some embodiments, the data interface 105 connects with the peripheral device wirelessly, such as through a Wi-Fi or a BLUETOOTH™ connection. In some embodiments, the data interface 105 processes the received raw image data to produce sets of corresponding frame data. In some embodiments, the data interface 105 stores decoding software and includes a processor that executes the software to process the raw image data. In some embodiments, the data interface 105 further includes decoding hardware, e.g., one or more ASICs or graphics processors, to process the raw image data. More specifically, when the image data is in video format, the data interface 105, through decoding software/hardware, samples the video format image data, e.g., using a periodic sampling method, and creates sets of graphic format data as the frame data. In some embodiments, the sampling interval is equal to or less than 1/24 second. In some embodiments, the sampling method can be interpolation, polling, convolution, deconvolution, or other methods of video format image data sampling that are currently, or may become, available. More specifically, when the raw image data is vector graphic data, the decoding software/hardware of the data interface 105 converts the sets of vector graphic data into sets of raster graphic image data, or an LED-display-friendly dot matrix data structure that is currently, or may become, available, as the frame data. The data interface 105 further transmits the frame data to the image processing module 106.

More particularly, in some embodiments, the display frame buffer 110 receives the frame data from the data interface 105 one frame at a time. In some embodiments, the display frame buffer 110 receives the frame data in chronological order. In some other embodiments, the display frame buffer 110 receives the frame data in the order that the frame data is stored in a storage medium connected to the data interface 105. More specifically, the frame data received by the frame buffer 110 can be frame data converted from raw image data by the data interface 105, or image data received by the data interface 105 already in frame data format. In some embodiments, the data interface 105 directly connects to the display frame buffer 110.

Still with reference to FIG. 1, in some embodiments, the data interface 105 transmits the frame data to the frame buffer 110 and to the processing unit and time controller 125 at the same time. The processing unit and time controller 125 is configured to provide a compensation value for the frame data. In some embodiments, the compensation value is a set of parameters stored in the processing unit and time controller 125, for accentuating or sharpening image features. In some embodiments not shown in FIG. 1, the processing unit and time controller 125 is coupled to an OTP memory and receives the compensation value provided by the OTP memory. The processing unit and time controller 125 is configured to process the frame data received from the frame buffer 110. In some embodiments, the processing unit and time controller 125 includes a processor and stores an executable computer program that c determines the compensation value. In some embodiments, as more fully described below, the raw image data is also accessible by the processing unit and time controller 125. In such embodiments, the programming causes the processing unit and time controller 125 to accentuate, or sharpen, image features of the image represented by the raw image data, such as edges of a specific shape in the image, boundaries between different areas in the image, or color contrast, not only to restore lost graphical information and remove graphical noise created during the process of converting raw data to frame data, but also to format the graphic display to be more suitable for micro-LED display.

The OTP memory, not shown in FIG. 1, is coupled to the processing unit and time controller 125 and to the data interface 105. In some embodiments, the data interface 105 transmits LED-display-friendly frame data to the display frame buffer 110, and at the same time, the data interface 105 transmits both the raw image data and frame data to the OTP memory that is not shown in FIG. 1. As used herein, the raw image data is also referred to as standard image data. In some embodiments not shown in FIG. 1, the OTP memory stores one or more image processing programs that can be executed by the processor of the processing unit and time controller 125 to calculate the compensation value based on comparing the raw image data, such as rich-information raster data or a vector image, to the frame data. Specifically, the OTP memory stores one or more programs that can be executed by the processor of the processing unit and time controller 125 to process a raster image pixel-by-pixel or process a vector image by areas and boundaries. In some embodiments, the OTP memory outputs a compensation value to enhance or to refine the frame data so that the frame data can be more suitable for an LED display. In some embodiments, the OTP memory calculates the compensation value based on the frame data stored in the display frame buffer 110 and the raw video image data captured or received by the data interface 105. When raw data of a video clip is processed by the data interface 105, some image features may be lost during the decoding process of decoding the video clip into a series of discrete frame data. The raw image data transmitted to the OTP memory has more detail, such as color, contrast, and brightness. The raw image usually is large in size and cannot be displayed directly on an LED display. By comparing the stored frame data of the video clip to the raw image data, the OTP memory calculates a compensation value to enhance the image represented by the frame data, so that the frame data can better represent the features in the raw image data, when displayed on the LED display.

The processing unit and time controller 125 combines the frame data stored in the frame buffer 110 with the compensation value provided by the OTP memory, and produces optimized frame data to transmit to the column driver 115. In some embodiments, the compensation value calculated by the OTP memory is a compensation value matrix. In some embodiments, the compensation value is a preset value previously stored in the OTP memory. In some embodiments, the processing unit and time controller 125 produces the optimized frame data by processing the frame data pixel by pixel. The processing by the processing unit and time controller 125, in some embodiments, includes adding certain values to, or subtracting certain values from, the specific pixel according to the compensation value matrix.

In some embodiments, the display frame buffer 110 is coupled between the processing unit and time controller 125 and the column driver 115. The display frame buffer 110 transmits the optimized frame data it receives from the processing unit and time controller 125 to the column driver 115. In some embodiments, the processing unit and time controller 125 is coupled to the column driver 115 and directly transmits the optimized frame data to the column driver 115. In some embodiments, the processing unit and time controller 125 is also coupled to the row driver 135 and directly transmits the optimized frame data to the row driver 135.

Consistent with the present disclosure, the column driver 115, being coupled to the pixel driver controller array 120, controls image display by controlling pixel scanning by column. The row driver 135, being coupled to the pixel driver controller array 120, controls the image display by controlling pixel scanning by row. The pixel driver controller array 120 receives frame data from the column driver 115 and the row driver 135, together or separately. In some embodiments, the pixel driver controller array 120 is an integrated LED circuit. In some embodiments, the pixel driver controller array 120 comprises at least one pixel driver controller 200, as depicted in FIG. 2 and described more fully below.

Figure 2:
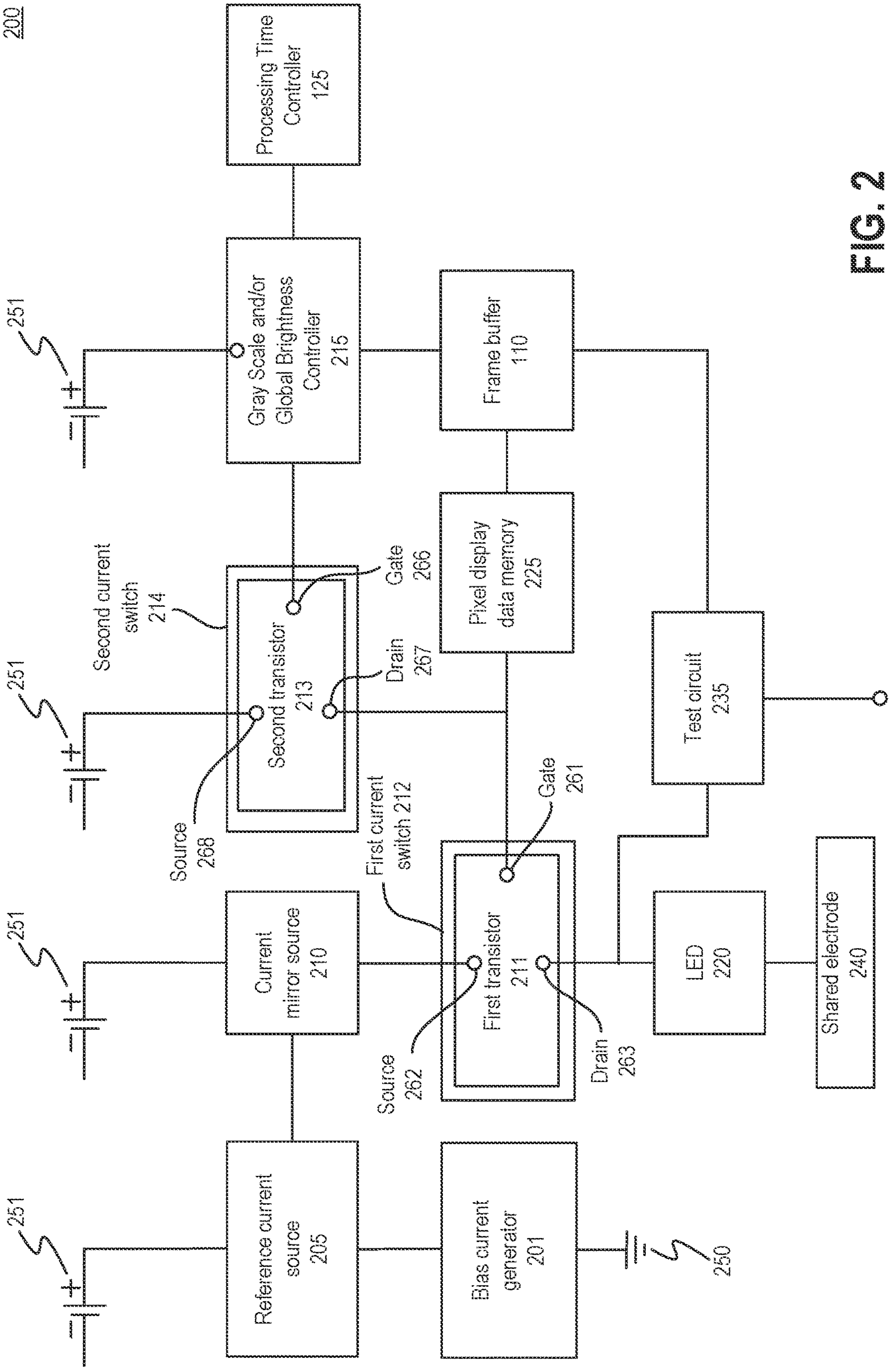
FIG. 2 is a schematic block diagram of a pixel driver controller of the micro display back plane system, according to an exemplary embodiment of the present disclosure.

FIG. 2 is a schematic block diagram of components of the exemplary pixel driver controller 200, consistent with embodiments of the present disclosure. The pixel driver controller 200 receives power from a bias current generator 201 that is connected to an external voltage reference, e.g., ground, 250. The pixel driver controller 200 also receives power from at least one external direct current power supply 251 that is coupled to a reference current source 205 and a current mirror source 210. In some embodiments, the bias current generator 201 is provided as a power generator that produces a fixed DC voltage or current for operating the pixel driver controller 200. In some embodiments, the bias current generator 201 can be external to the pixel driver controller 200. The pixel driver controller 200 includes the reference current source 205 that provides a reference current that is stable and does not fluctuate with temperature, supply voltages, or loads. The reference current source 205 provides the reference current for operation of the pixel driver controller 200. The pixel driver controller 200 also includes the current mirror source 210 that generates a mirror current that is a copy of the reference current provided by the reference current source 205. The current mirror source 210 controls the current in an LED device 220 and maintains an output mirror current of the current mirror source 210 constant, regardless of loading. The current mirror source 210 is coupled to receive the reference current provided by the reference current source 205. In some embodiments, a transistor gate of the current mirror sources 210 connects with a transistor gate of the reference current source 205. In some embodiments, a transistor drain of the reference current source 205 connects with the transistor gate of the reference current source 205. In some embodiments, the transistor drain of the reference current source 205 is configured to be the source of and provide electric power to the current mirror sources 210. When the transistor gate of the current mirror source 210 is in a switch-on status, electricity flows directly from the transistor drain of the reference current source 205 to the transistor gate of the current mirror source 210, so that it decreases drain-to-source bias of the current mirror source 210.

The pixel driver controller 200 also includes at least two current switches. For example, as shown in FIG. 2, the pixel driver controller includes a first current switch 212 and a second current switch 214. As described below in more detail, each of the first current switch 212 and second current switch 214 includes one or more transistors. Both the first current switch 212 and the second current switch 214 are configured to control the "on" and "off" status of a circuit. In some embodiments, the switch-on status of the first switch 212 and the second switch 214 refers to the turn-on time duration (i.e., pulse width) of the first switch 212 and the second switch 214, and/or a duty cycle of the first switch 212 and the second switch 214. The duty cycle is a percentage of the switch-on time over a given period of time.

The pixel driver controller 200 also includes a pixel display data memory 225 provided as an internal memory chip or circuit. The pixel display data memory 225 is used to store frame data that the pixel driver controller 200 receives, for example, from either column driver 115 or row driver 135, or from both. In the embodiment depicted in FIG. 2, both the first current switch 212 and the second current switch 214 are connected with the pixel display data memory 225. In some embodiments, the pixel display data memory 225 is coupled to the frame buffer 110 and receives data from frame buffer 110.

The pixel driver controller 200 also includes a gray scale and/or global brightness controller 215 configured to control at least one of a gray scale level or a global brightness of the LED device 220. The gray scale and/or global brightness controller 215 is coupled to the processing unit and time controller 125 and receives the optimized image data from the processing unit and time controller 125. The gray scale and/or global brightness controller 215 is also coupled to the second current switch 214 and configured to switch on or off the second current switch 214 based on the optimized image data. As described below in more detail, by controlling the switch-on status (e.g., pulse width or duty cycle) of the second current switch 214, the gray scale and/or global brightness controller 215 can adjust the global brightness and/or gray scale levels of the images displayed by the LED device 220.

In some embodiments, the first current switch 212 includes a first transistor 211 and the second current switch 214 includes a second transistor 213. The first transistor 211 includes a gate 261, a source 262, and a drain 263. The second transistor 213 includes a gate 266, a source 268, and a drain 267. The gate 266 of the second transistor 213 is coupled to the gray scale and/or global brightness controller 215. The source 268 of the second transistor 213 is coupled to the external direct current power supply 251. The drain 267 of the second transistor 213 is coupled to the gate 261 of the first transistor 211. The source 262 of the first transistor 211 is coupled to the current mirror source 210. The drain 263 of the first transistor 211 is coupled to the LED device 220. In some embodiments, the pixel display data memory 225 is coupled to the gate 261 of the first transistor 211. In some embodiments, both the source 262 and the source 268 are configured to receive power from the external direct current power supply 251.

In some embodiments, the first transistor 211 is used to control the gray scale levels of the LED device 220 and the second transistor 213 is used to control the global brightness of the LED device 220. Specifically, the gray scale and/or global brightness controller 215 is provided as a current controller that is configured to receive the constant mirror current and control the current in the LED device 220, so as to control the brightness of the LED device 220. In some embodiments, the gray scale and/or global brightness controller 215 is coupled to the second current switch 214 and adjusts a current value of the LED device 220. In some embodiments, the gray scale value of the LED device 220 can be an RGB color scale value. A typical LED device 220 that is capable of emitting color includes at least two light-emitting units, such as micro LED light bulbs. Each micro LED light bulb emits a single colored light such as red, green, or blue. In some embodiments, the LED device 220 also includes an optical combining device that combines the respective lights of the single colored light-emitting micro LED's lights and presents a colored light on the LED device 220. In some embodiments, the gray scale and/or global brightness controller 215 is coupled to a processing unit and time controller 125.

In some embodiments, the first transistor 211 is used to control the gray scale levels of the LED device 220 and the second transistor 213 is used to control the global brightness of the LED device 220. Specifically, the pixel display data memory 225 receives frame data from the frame buffer 110. The frame data includes pixel display data used for encoding the gray scales of a picture frame. The pixel display data memory 225 may be a one-bit memory, which supplies one bit of pixel display signal (i.e., one pulse) at each point in time to the gate 261 of the first transistor 211. The pixel display signal controls the switch-on and switch-off states of the first transistor 211, to control the gray scale levels. For example, a set of 8 bits of pixel display signals transmitted consecutively in time can be used to switch on/off the first transistor to generate 255 (i.e., $2^8-1$) non-zero gray scale levels (or 256 gray scale levels if zero gray scale is considered to a separate gray scale level). Specifically, the pulse widths of the 8 pixel display signals may be T, 2T, 4T, 8T, 16T, 32T, 64T, and 128T, respectively, wherein "T" denotes a minimum period of time. The 8 pulses cause the first transistor 211 to be switched on in T, 2T, 4T, 8T, 16T, 32T, 64T, and 128T durations, thereby causing the LED device 220 to generate 8 one-bit frames respectively, which are superimposed in time to result in an eight-bit frame that has 255 gray scale levels. The total time used for transmitting the 8 pulses corresponds to the refresh rate of the LED device 220. The above example is for illustrative purpose only and a one-bit pixel display data memory 225 is not limited to generating 255 gray scale levels. Particularly, the above example can be generalized to generate N consecutive pulses in time, with pulse widths T, 2T, . . . $2^N$T, respectively. The N pulses can be used to switch on the first transistor 211 to generate an N-bit frame having $2^N-1$ non-zero gray scale levels.

As indicated above, in the embodiments associated with the one-bit pixel display data memory 225, the second transistor 213 is used to control the global brightness of the LED device 220. Specifically, the gray scale and/or global brightness controller 215 receives the optimized image data from the processing unit and time controller 125. The optimized image data contains control information used for controlling the global brightness of the gray scale image which, as described above, is generated by switching on-off the first transistor 211. Based on the global brightness control information, the gray scale and/or global brightness controller 215 adjusts the duty cycle of the second transistor 213, to control the global brightness. For example, if the second transistor 213 has a 100% cycle—the second transistor 213 is always switched on, the gray scale image has the maximum global brightness. If the second transistor 213 has a 50% cycle instead, the resulted drain signal from the drain 267 of the second transistor 213 can turn off the first transistor 211 during 50% of each of the T, 2T, . . . $2^N$T pulse times, thereby reducing the global brightness to 50% of its maximum value. As such, specific global brightness values can be achieved by controlling the duty cycles of the second transistor 213.

In some embodiments, an N-bit (e.g., eight-bit) pixel display data memory 225 is used to supply N pulses (e.g., 8 pulses) to the first current switch 212 at the same time. For illustrative purpose only, the following description assumes the pixel display data memory 225 is eight bits. Specifically, the first current switch 212 includes eight first transistors 211 (not shown in FIG. 2). Each of the eight first transistors 211 has a source 262 connected to the current mirror source 210, a drain 263 connected to the LED device 220, and a gate 261 connected to the eight-bit pixel display data memory 225. Moreover, the second current switch 214 includes eight second transistors 213 (not shown in FIG. 2). Each of the eight second transistors 213 has a source 268 connected to the external direct current power supply 251, a drain 267 connected to a corresponding first transistor 211's gate 261, and a gate 266 connected to the gray scale and/or global brightness controller 215. With this configuration, the drains 267 of the eight second transistors 213 are connected to the gates 261 of the eight first transistors 211, respectively. This way, eight pairs of first transistor and second transistor are formed, i.e., pair 0, pair 1, pair 2, pair 3, pair 4, pair 5, pair 6, and pair 7. In each pair, the second transistor 213 can be used to switch on/off the respectively first transistor 211.

In the present embodiments, the eight-bit pixel display data memory 225 supplies eight pixel display signals to the eight first transistors 211 respectively, switching on/off the eight first transistors 211 in parallel to cause the LED device 220 to display an eight-bit frame. Moreover, the gray scale and/or global brightness controller 215 switches on/off the eight second transistors 213 to control at least one of the gray scale level or global brightness of the eight-bit frame. Specifically, the gray scale and/or global brightness controller 215 switches on the eight second transistors 213 in time durations T, 2T, 4T, 8T, 16T, 32T, 64T, and 128T, respectively. Consequently, the eight second transistors 213 controls the switch-on durations of the eight first transistors 211 respectively, to generate 255 non-zero gray scale values. Additionally or alternatively, the gray scale and/or global brightness controller 215 controls the duty cycles of the eight second transistors 213 to adjust the global brightness. For example, the global brightness is set to maximum if the eight second transistors 213 have a 100% duty cycle. The global brightness controller is reduced to 50% of its maximum value if the proportion of "on" time of the second current switch 214 is decreased to 50% of the duty cycle. As such, specific gray scale values and/or global brightness levels can be determined by the switch-on status of the second current switch 214.

The pixel driver controller 200 also includes a test circuit 235 that is configured to test the current and voltage stability of the pixel driver controller 200.

The pixel driver controller 200 also includes a shared electrode 240 provided as a conductor that is used to make contact with a circuit. In some embodiments, the shared electrode 240 is configured to enable multiple pixel driver controllers 200 to be electrically connected through their respective shared electrodes 240 and form the pixel driver controller array 120 illustrated in FIG. 1. In some embodiments, each pixel driver controller 200 of the pixel driver controller array 120 is configured to control its corresponding LED device 220. The LED device 220 is further configured so that multiple LED devices 220 can be formed as a master LED device. Accordingly, the display of the master LED device is controlled by the pixel driver controller array 120.

In some embodiments, the bias current generator 201 provides a stable current at a specified electric potential. In some embodiments consistent with FIG. 2, the reference current source 205 and the current mirror source 210 are in the same integrated circuit and the reference current value is equal to the mirror current value. In the embodiment depicted in FIG. 2, the current mirror source 210 connects to the first current switch 212 controlling the switch-on and switch-off status of the LED device 220 according to frame data the pixel driver controller 200 receives. In some embodiments, the shared electrode 240 is configured to make contact with an external power source and configured to receive positive-type (p-type) junctions of at least one LED device 220.

In some embodiments consistent with FIG. 2, the second current switch 214 is coupled to the gray scale and/or global brightness controller 215 in series. In some embodiments, when the first current switch 212 is in switch-on status and the second current switch 214 is in switch-off status, a gray scale value and the brightness value of the LED device 220 are solely determined by the frame data that pixel driver controller 200 receives from the row driver 135 or the column driver 115 and stores in the pixel display data memory 225. In some embodiments, the gray scale value of the LED device 220 can be an RGB color scale value.

Further according to this embodiment, an LED screen that includes multiple LED devices 220 can display an optimized gray scale or color scale image.

In some embodiments, the gray scale and/or global brightness controller 215 connects with external power source 251 and controls the switch-on status of the second current switch 214. In this specific embodiment, the gray scale controller and/or global brightness 215 includes a microchip configured to process frame data the gray scale and/or global brightness controller 215 receives from either column driver 115 or row driver 135, or from both. In some embodiments, the microchip of the gray scale and/or global brightness controller 215 includes pre-installed image processing software. In some embodiments, the gray scale and/or global brightness controller 215 examines the gray scale values of frame data and determines if the values are above a threshold such that the current flowing to the LED device 220 would cause the LED device 220 to display background lights. In this specific embodiment, the gray scale and/or global brightness controller 215 adjusts the gray scale value of the frame data so that the LED device 220 displays the frame data without displaying background lights noticeable to human eyes. In some embodiments, the gray scale value of the LED device 220 can be an RGB color scale value.

In some embodiments, the gray scale and/or global brightness controller 215 increases the brightness of the LED device 220 when the brightness of the frame data is below a threshold and the contrast of the frame data is not sufficient for proper display. In some embodiments, the global brightness controller dims the display of the LED device 220 when the brightness of the frame data exceeds a threshold and the contrast of the frame data is not properly displayed. In some embodiments, the test circuit 235 is coupled to the gray scale and/or global brightness controller 215 and the LED device 220. The test circuit 235 tests the brightness of the LED device 220 and feeds back the brightness test result to the gray scale and/or global brightness controller 215 to adjust the brightness of the LED device 220. In some embodiments, the test circuit 235 is coupled with an external terminal computer.

In some embodiments, multiple pixel driver controllers 200 depicted in FIG. 2 can be configured to form the pixel driver controller array 120 depicted in FIG. 1.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

We claim:

1. A pixel driver controller, comprising:
- a reference current source configured to supply a reference current;
- a current mirror source, coupled to receive the reference current, configured to provide a mirror current having a current value equal to a current value of the reference current;
- a first current switch coupled to the current mirror source to receive the mirror current, the first current switch being further coupled to a light emitting diode (LED) device to control flow of the mirror current to the LED device;
- a pixel display data memory coupled to the first current switch and configured to store pixel display data;
- a second current switch coupled to the first current switch;
- a power source coupled to the reference current source, the current mirror source, and the second current switch; and
- a controller coupled to the second switch and configured to control at least one of a global brightness or a gray scale level of the LED device by controlling a switch-on status of the second current switch.

2. The pixel driver controller according to claim 1, wherein the first current switch comprises a first set of one or more transistors and the second current switch comprises a second set of one or more transistors respectively coupled to the first set of one or more transistors; gates of the second set of one or more transistors are coupled to the controller; sources of the second set of one or more transistors are coupled to the power source; drains of the second set of one or more transistors are respectively coupled to gates of the first set of one or more transistors; sources of the first set of one or more transistors are coupled to the current mirror source; drains of the first set of one or more transistor are coupled to the LED device; and the pixel display data memory is coupled to the gates of the first set of one or more transistors.

3. The pixel driver controller according to claim 1, wherein the controller is configured to control the gray scale level by controlling a switch-on time duration of the second current switch.

4. The pixel driver controller according to claim 1, wherein the controller is configured to control the global brightness of the LED device by controlling a duty cycle of the second current switch.

5. The pixel driver controller according to claim 1, further comprising a test circuit coupled to the LED device and the controller.

6. A display back plane system, comprising:
- a power controller, and
- a pixel driving controller array, wherein the pixel driving controller array comprises:
  - a reference current source configured to supply a reference current;
  - a current mirror source, coupled to receive the reference current, configured to provide a mirror current having a current value equal to a current value of the reference current;
  - a first current switch coupled to the current mirror source to receive the mirror current, the first current switch being further coupled to a light emitting diode (LED) device to control flow of the mirror current to the LED device;
  - a pixel display data memory coupled to the first current switch and configured to store pixel display data;
  - a second current switch coupled to the first current switch;
  - a power source coupled to the reference current source, the current mirror source, and the second current switch; and
  - a processing time controller coupled to the second switch and configured to control at least one of a global brightness or a gray scale level of the LED device by controlling a switch-on status of the second current switch.

7. The display back plane system according to claim 6, wherein the first current switch comprises a first set of one or more transistors and the second current switch comprises a second set of one or more transistors respectively coupled to the first set of one or more transistors; gates of the second set of one or more transistors are coupled to the processing time controller; sources of the second set of one or more transistors are coupled to the power source; drains of the second set of one or more transistors are respectively coupled to gates of the first set of one or more transistors; sources of the first set of one or more transistors are coupled to the current mirror source; drains of the first set of one or more transistor are coupled to the LED device; and the pixel display data memory is coupled to the gates of the first set of one or more transistors.

8. The display back plane system according to claim 6, wherein the processing time controller is configured to control the gray scale level by controlling a switch-on time duration of the second current switch.

9. The display back plane system according to claim 6, wherein the processing time controller is configured to control the global brightness of the LED device by controlling a duty cycle of the second current switch.

10. The display back plane system according to claim 6, further comprising a test circuit coupled to the LED device and the processing time controller.

11. The display back plane system according to claim 6, further comprising at least one of a data interface, a row driver, or a sensor.

12. A display, comprising:

a light emitting diode (LED);

a reference current source configured to supply a reference current;

a current mirror source, coupled to receive the reference current, configured to provide a mirror current having a current value equal to a current value of the reference current;

a first current switch coupled to the current mirror source to receive the mirror current, the first current switch being further coupled to the LED device to control flow of the mirror current to the LED device;

a pixel display data memory coupled to the first current switch and configured to store pixel display data;

a second current switch coupled to the first current switch;

a power source coupled to the reference current source, the current mirror source, and the second current switch; and a controller coupled to the second switch and configured to control at least one of a global brightness or a gray scale level of the LED device by controlling a switch-on status of the second current switch.

13. The display according to claim 12, wherein the first current switch comprises a first set of one or more transistors and the second current switch comprises a second set of one or more transistors respectively coupled to the first set of one or more transistors; gates of the second set of one or more transistors are coupled to the controller; sources of the second set of one or more transistors are coupled to the power source; drains of the second set of one or more transistors are respectively coupled to gates of the first set of one or more transistors; sources of the first set of one or more transistors are coupled to the current mirror source; drains of the first set of one or more transistor are coupled to the LED device; and the pixel display data memory is coupled to the gates of the first set of one or more transistors.

14. The display according to claim 12, wherein the controller is configured to control the gray scale level by controlling a switch-on time duration of the second current switch.

15. The display according to claim 12, wherein the controller is configured to control the global brightness of the LED device by controlling a duty cycle of the second current switch.

16. The display according to claim 12, further comprising a test circuit coupled to the LED device and the controller.

* * * * *